(12) United States Patent
Ogawa

(10) Patent No.: US 7,322,405 B2
(45) Date of Patent: Jan. 29, 2008

(54) MULTI-PIPE HEAT EXCHANGER APPARATUS AND METHOD OF PRODUCING THE SAME

(75) Inventor: Tetsuya Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 11/317,823

(22) Filed: Dec. 22, 2005

(65) Prior Publication Data

US 2006/0131008 A1 Jun. 22, 2006

(30) Foreign Application Priority Data

Dec. 22, 2004 (JP) ............................ 2004-370868

(51) Int. Cl.
*F28F 9/02* (2006.01)
(52) U.S. Cl. .................... 165/158; 165/125; 29/890.03
(58) Field of Classification Search ................ 165/125, 165/146, 147, 158, 172, 173, 175; 29/891.03
See application file for complete search history.

(56) References Cited

U.S. PATENT DOCUMENTS

| | | | | | |
|---|---|---|---|---|---|
| 721,310 | A | * | 2/1903 | Junkers | ................. 165/161 |
| 1,762,465 | A | * | 6/1930 | Bovey | ................. 165/41 |
| 2,006,649 | A | * | 7/1935 | Modine | ................. 165/146 |
| 2,421,371 | A | * | 6/1947 | Budlane | ................. 165/147 |
| 2,439,775 | A | * | 4/1948 | Kennedy | ................. 165/124 |
| 3,055,641 | A | * | 9/1962 | Miller | ................. 165/81 |
| 3,379,244 | A | | 4/1968 | Gilli | |
| 4,063,589 | A | | 12/1977 | Battcock et al. | |
| 4,836,276 | A | * | 6/1989 | Yamanaka et al. | ............ 165/51 |
| 4,909,311 | A | * | 3/1990 | Nakamura et al. | ............ 165/41 |
| 2001/0009732 | A1 | | 7/2001 | Schuler | |
| 2002/0134537 | A1 | * | 9/2002 | Memory et al. | ............ 165/151 |
| 2004/0134640 | A1 | | 7/2004 | Sakakibara et al. | |
| 2004/0211548 | A1 | | 10/2004 | Berchowitz et al. | |

FOREIGN PATENT DOCUMENTS

| | | |
|---|---|---|
| JP | 62-176066 | 8/1987 |
| JP | 04-019967 | 1/1992 |

(Continued)

OTHER PUBLICATIONS

International Search Report for Application No. PCT/JP2005/024181, dated Jul. 28, 2006.
International Preliminary Report on Patentability and Written Opinion for International Application No. PCTJP2005/024180, dated Aug. 23, 2007.

*Primary Examiner*—Teresa J. Walberg
(74) *Attorney, Agent, or Firm*—Lahive & Cockfield, LLP; Anthony A. Laurentano, Esq.

(57) ABSTRACT

In a heat exchanger, a plurality of heat conductive pipes forming first passages are provided between an outer wall plate and an inner wall plate. Air flows through the first passages. Second passages are formed between the heat conductive pipes. An exhaust gas flows through the second passages. Each of the heat conductive pipes has opposite walls limiting the passage width of the first passage. The walls are formed along involute curves. The second passages are formed by providing adjacent heat conductive pipes along the involute curves.

9 Claims, 14 Drawing Sheets

FOREIGN PATENT DOCUMENTS

| | | |
|---|---|---|
| JP | 07/103160 | 4/1995 |
| JP | 08/261679 | 10/1996 |
| JP | 2002/350081 | 12/2002 |
| JP | 2003/183003 | 7/2003 |
| JP | 2003/229164 | 8/2003 |
| WO | WO-98/33226 A1 | 7/1998 |
| WO | WO-99/44252 A1 | 9/1999 |

* cited by examiner

→ FUEL GAS
→ AIR (OXYGEN-CONTAINING GAS)

MULTI-PIPE HEAT EXCHANGER APPARATUS AND METHOD OF PRODUCING THE SAME

BACKGROUND OF THE INVENTION

1. Field of the Invention

The present invention relates to a multi-pipe heat exchanger apparatus and a method of producing the heat exchanger apparatus. The heat exchanger apparatus includes a body unit, and a plurality of heat conductive pipes provided in the body unit. First passages for a first fluid are formed in the heat conductive pipes, and second passages for a second fluid are formed between the heat conductive pipes.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell, an oxygen-containing gas or the air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

In the fuel cell, a heat exchanger is used for heating the air supplied to the cathode by heat exchange with the exhaust gas (reactant gas after consumption) or the like. For example, as one type of the heat exchanger, a multi-pipe heat exchanger as disclosed in Japanese Laid-Open Patent Publication No. 8-261679 is known.

As shown in FIG. 14, the multi-pipe heat exchanger includes a plurality of heat conductive pipes 1 arranged in parallel. Opposite ends of the heat conductive pipes 1 are joined to tubular plates 2a, 2b. The heat conductive pipes 1 are supported by the tubular plates 2a, 2b. Each of the heat conductive pipes 1 has a substantially oval cross section. At least one rib (not shown) extends in the heat conductive pipe 1 in parallel with the longitudinal direction.

In the conventional technique, in order to increase the efficiency in heat exchange between the fluid flowing inside the heat conductive pipes 1 and the fluid flowing outside the heat conductive pipes 1 or in order to increase the heat conductive surface area, it is necessary to increase the number of the heat conductive pipes 1. However, it is necessary to decrease the diameter of the heat conductive pipes 1 for increasing the number of the heat conductive pipes 1. Therefore, the pressure loss of the fluid flowing inside the heat conductive pipes 1 becomes large. Thus, it is not possible to increase the amount of fluid supplied into the heat conductive pipes 1, and it is not possible to increase the efficiency in the heat exchanger apparatus.

Further, due to the space constraint, there is a limit in the number of the heat conductive pipes 1 which can be increased. The volume ratio of the fluid flowing inside the heat conductive pipes 1 to the fluid flowing outside the heat conductive pipes 1 is not constant. Therefore, it is difficult to improve the heat exchange efficiency.

Further, as the number of the heat conductive pipes 1 increases, the surface area of the thick portion of the heat conductive pipes 1 increases. Thus, due to the excessive thickness of the heat conductive pipes 1, the heat capacity is increased, and the thermal efficiency is lowered significantly.

SUMMARY OF THE INVENTION

A main object of the present invention is to provide a multi-pipe heat exchanger apparatus having a simple and compact structure and a method of producing the multi-pipe heat exchanger apparatus in which it is possible to improve the heat exchange efficiency.

The present invention relates to a multi-pipe heat exchanger apparatus and a method of producing the heat exchanger apparatus. The heat exchanger apparatus includes a body unit and a plurality of heat conductive pipes provided in the body unit. First passages for a first fluid are formed in the heat conductive pipes. Second passages for a second fluid are formed between the heat conductive pipes. Each of the heat conductive pipes has opposite walls limiting the passage width of the first passage, and the walls are formed along involute curves.

It is preferable that flanges are provided at opposite ends of the body unit, and the heat conductive pipes are provided at the flanges at predetermined angular intervals. Further, it is preferable that each of the second passages is formed by providing adjacent heat conductive pipes along the involute curves.

Further, it is preferable that the heat conductive pipe has a seamless continuous shape. For example, the heat conductive pipe is formed into one piece by a drawing process or an extrusion process to have a seamless continuous shape.

Further, it is preferable that a first fluid inlet and a second fluid outlet are provided at one end of the body unit such that the first fluid flows into the first passages through the first fluid inlet and the second fluid is discharged from the second passages through the second fluid outlet, and a first fluid outlet and a second fluid inlet are provided at the other end of the body unit such that the first fluid is discharged from the first passages through the first fluid outlet and the second fluid flows into the second passages through the second fluid inlet. Further, it is preferable that the second fluid is an exhaust gas.

According to the present invention, the opposite walls of the heat conductive pipe are formed along the involute curves. Therefore, the passage width is constant in the entire first passage. The heat is transmitted from the second fluid flowing through the second passages to the first fluid flowing through the first passages efficiently. Thus, heat exchange efficiency is improved effectively. Further, non-uniform flow of the first fluid does not occur in the first passages. The first fluid flows smoothly, and improvement in the thermal efficiency is achieved.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
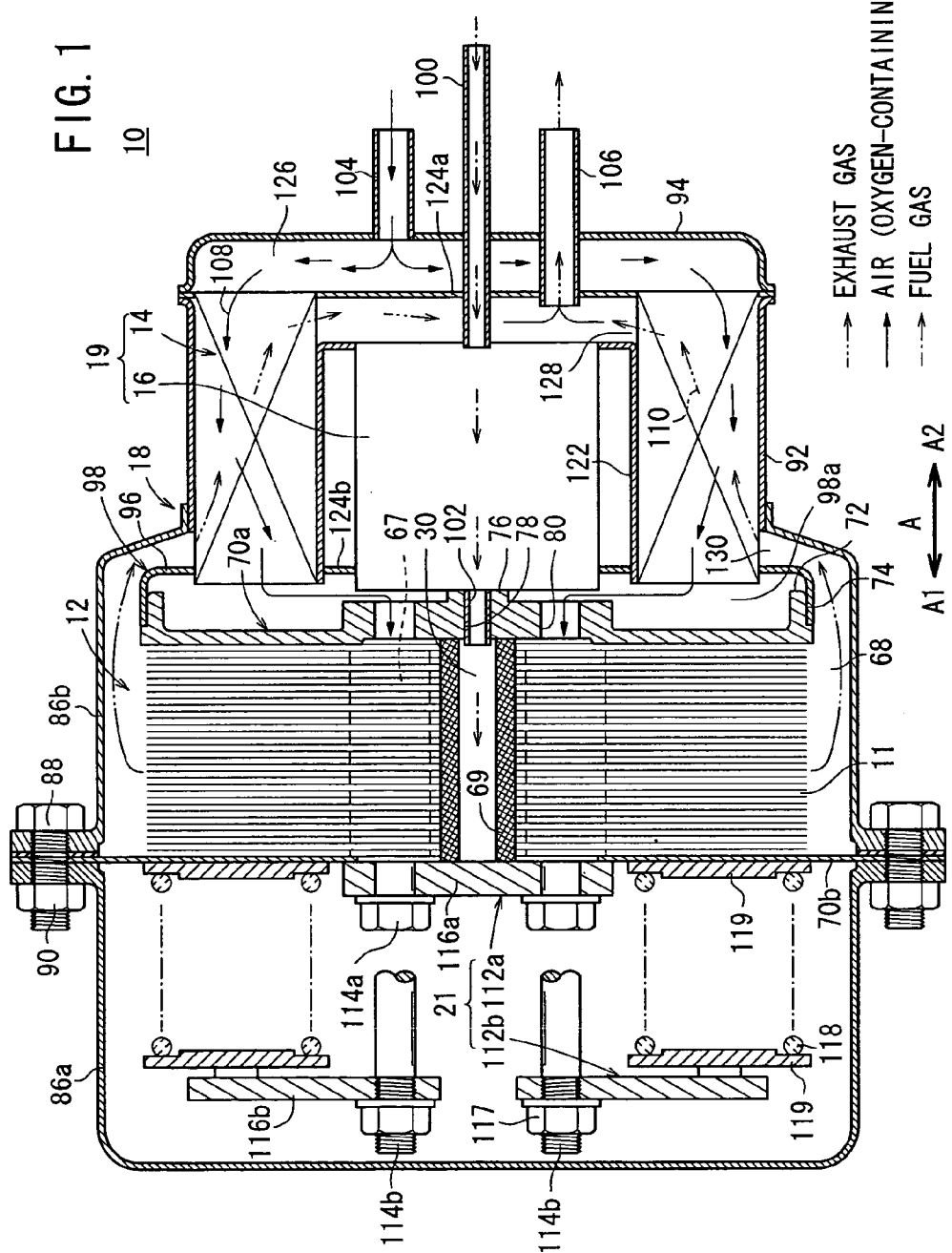
FIG. 1 is a partial cross sectional view showing a fuel cell system including a multi-pipe heat exchanger according to a first embodiment of the present invention.
Figure 2:
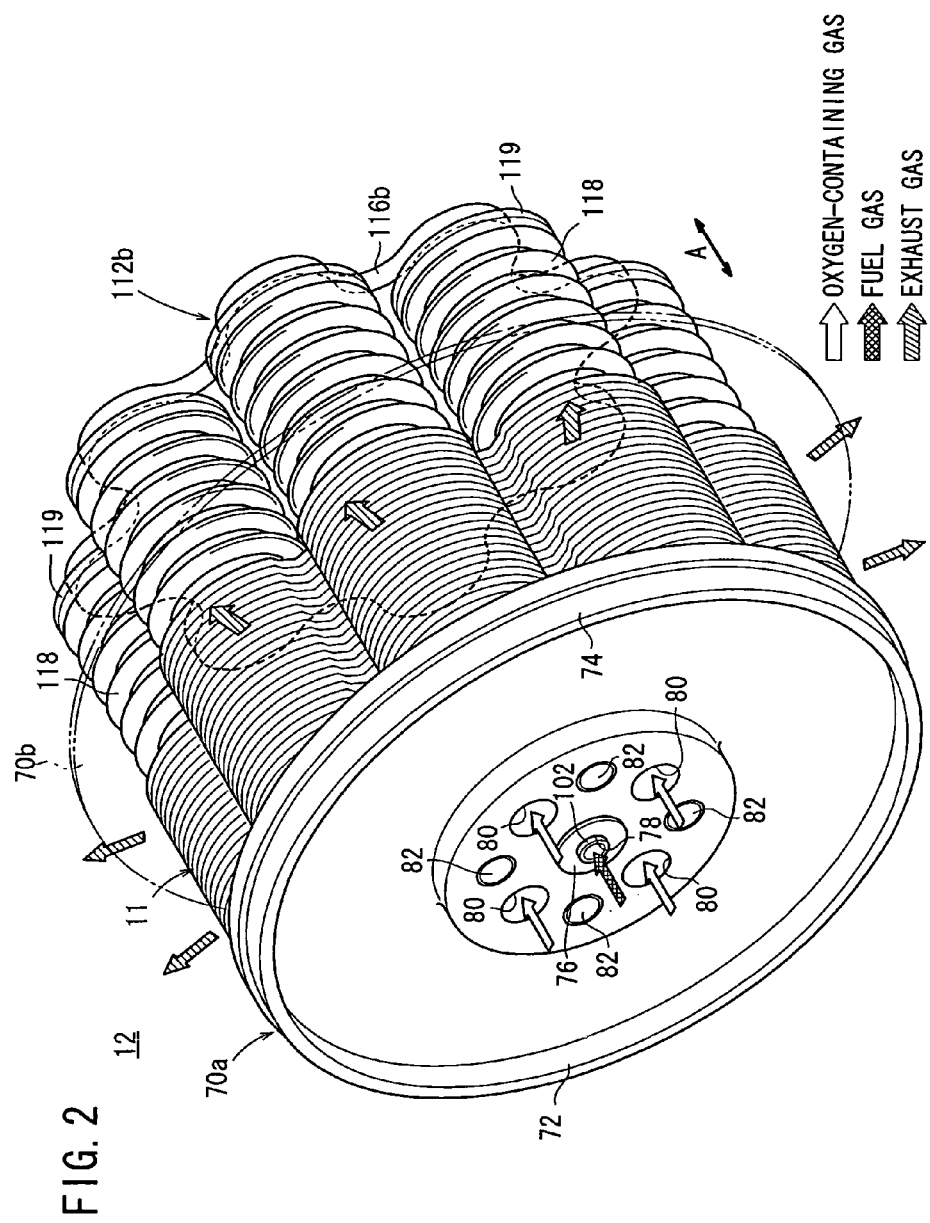
FIG. 2 is a perspective view schematically showing a fuel cell stack of the fuel cell system.

FIG. 1 is a partial cross sectional view showing a fuel cell system 10 including a multi-pipe heat exchanger apparatus according to a first embodiment of the present invention. FIG. 2 is a perspective view schematically showing a fuel cell stack 12 of the fuel cell system 10. The fuel cell stack 12 is formed by stacking a plurality of fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger (multi-pipe heat exchanger apparatus) 14, a reformer 16, and a casing 18. The heat exchanger 14 heats the oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
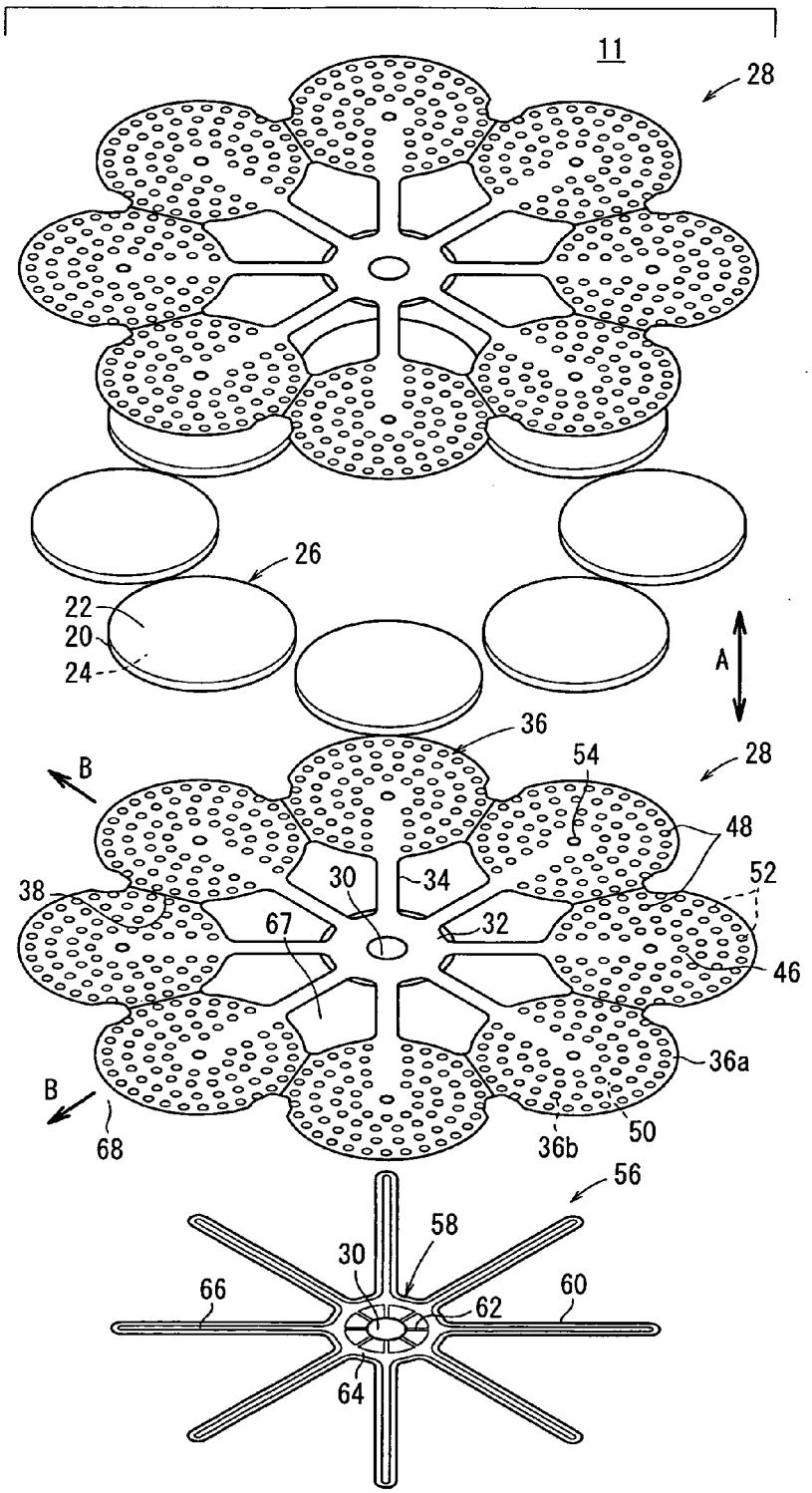
FIG. 3 is an exploded perspective view showing a fuel cell of the fuel cell stack.
Figure 4:
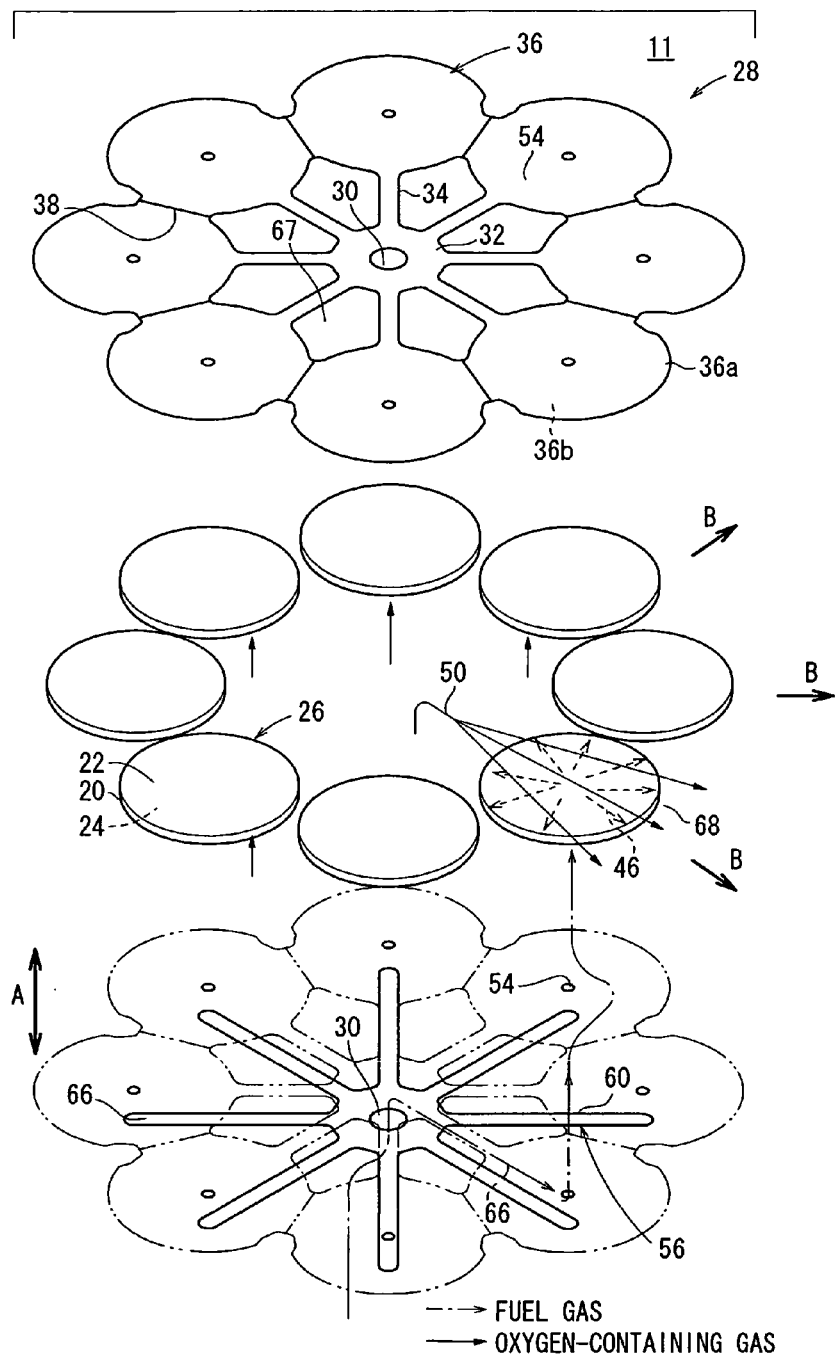
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 (central portion of the separator 28) for preventing the entry of the oxygen-containing gas.

A plurality of, e.g., eight electrolyte electrode assemblies 26 are interposed between a pair of separators 28 to form the fuel cell 11. The eight electrolyte electrode assemblies 26 are concentric with a fuel gas supply passage 30 extending through the center of the separators 28.

In FIG. 3, for example, each of the separators 28 comprises a metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated from each other by slits 38.

Each of the circular disks 36 has first protrusions 48 on its surface 36a which contacts the anode 24. The first protrusions 48 form a fuel gas channel 46 for supplying a fuel gas along an electrode surface of the anode 24. Each of the circular disks 36 has second protrusions 52 on its surface 36b which contacts the cathode 22 (see FIG. 5). The second protrusions 52 form the oxygen-containing gas channel 50 for supplying the oxygen-containing gas along an electrode surface of the cathode 22.

Figure 6:
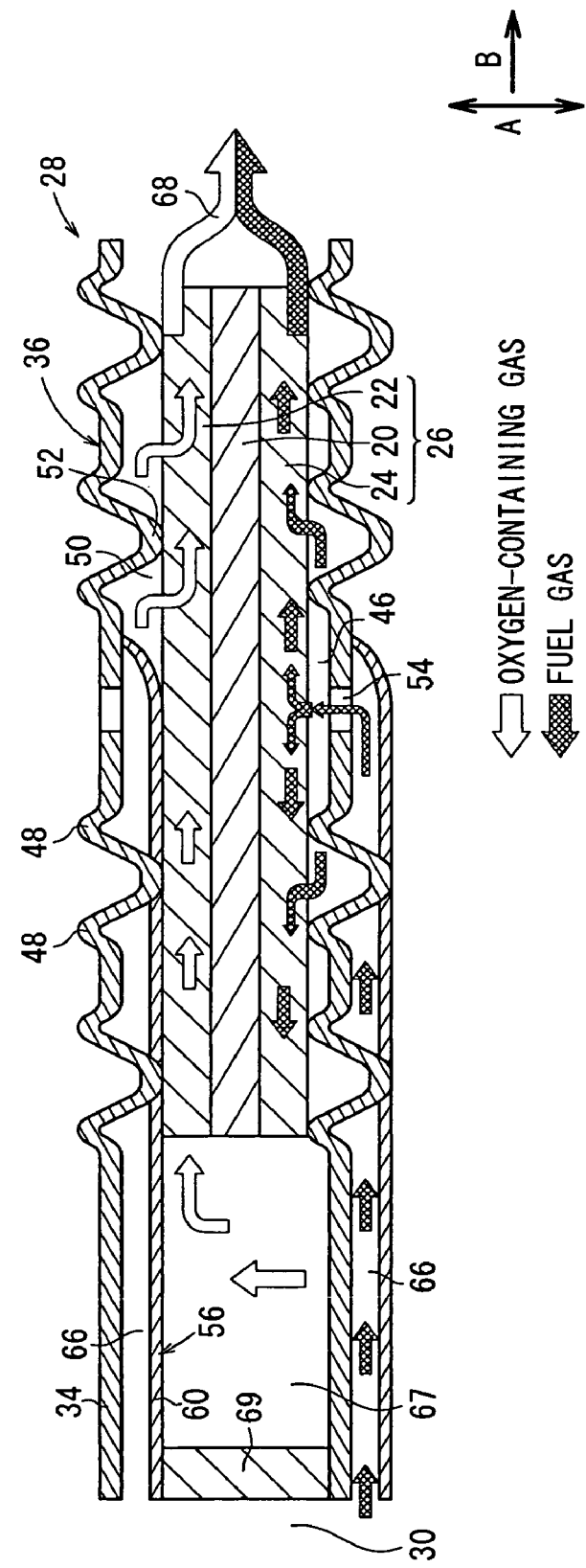
FIG. 6 is a cross sectional view schematically showing operation of the fuel cell.

As shown in FIG. 6, the first protrusions 48 and the second protrusions 52 protrude away from each other. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

Figure 5:
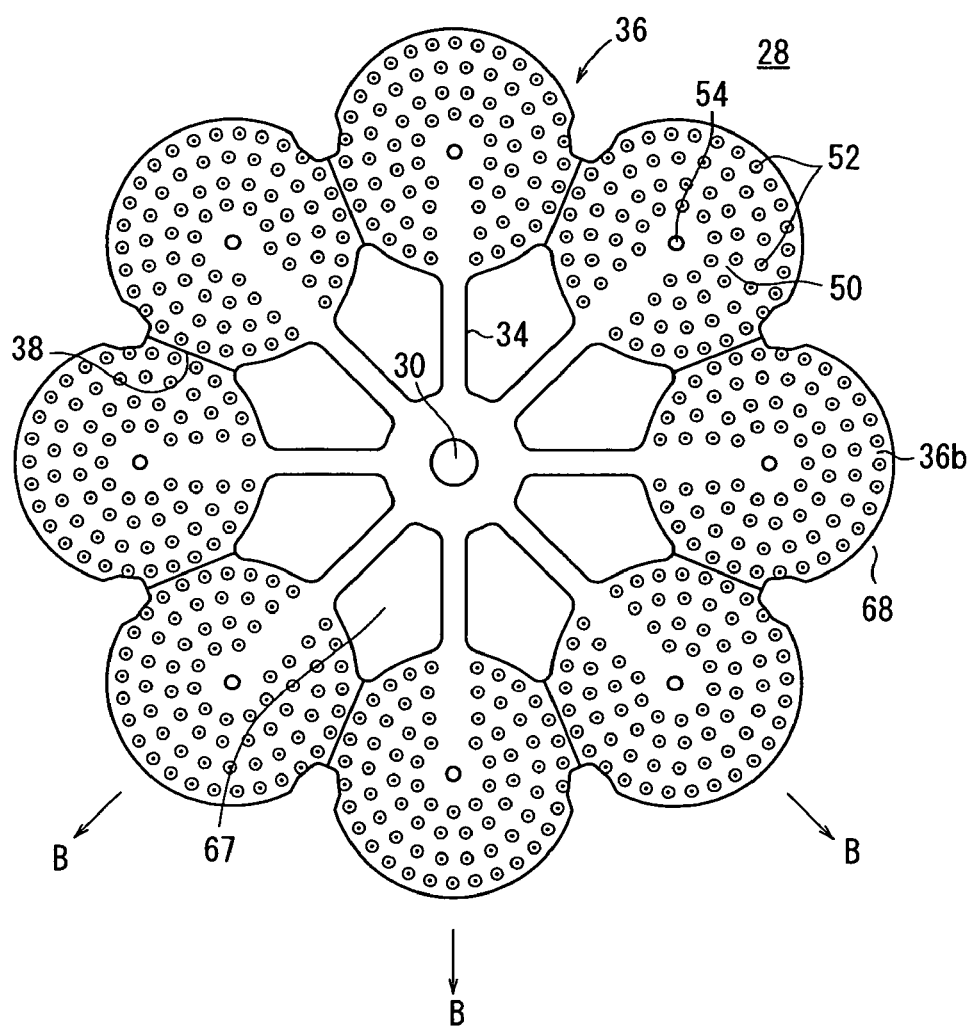
FIG. 5 is a front view showing a separator.

As shown in FIGS. 3 to 5, a fuel gas inlet 54 is provided in each of the circular disks 36. The fuel gas flows through the fuel gas inlet 54 into the fuel gas channel 46. The position of the fuel gas inlet 54 is determined so that the fuel gas can be distributed uniformly. For example, the fuel gas inlet 54 is provided at the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A fuel gas supply channel 66 is formed between the first and second bridges 34, 60. The fuel gas supply channel 66 is connected to the fuel gas channel 46 through the slits 62 and the recess 64.

As shown in FIG. 6, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 is formed by spaces between the inner sides of the respective circular disks 36 and the first bridges 34, and extends in the stacking direction.

Insulating seals 69 for sealing the fuel gas supply passage 30 is provided between the separators 28. For example, the insulating seals 69 are made of mica material, or ceramic material. An exhaust gas channel 68 extends through the fuel cells 11 in the stacking direction outside the respective circular disks 36.

As shown in FIGS. 1 and 2, the fuel cell stack 12 includes a plurality of fuel cells 11 stacked together, and end plates 70a, 70b provided at opposite ends in the stacking direction. The end plate 70a has a substantially circular disk shape. A ring shaped portion 72 is formed in the outer circumferential region of the end plate 70a. The ring shaped portion 72 axially protrudes from the end plate 70a. A groove 74 is formed around the ring shaped portion 72. A columnar protrusion 76 is provided at the center of the ring shaped portion 72. The columnar protrusion 76 and the ring shaped portion 72 protrude from the end plate 70a in the same direction. A hole 78 is formed at the center of the protrusion 76.

Figure 7:
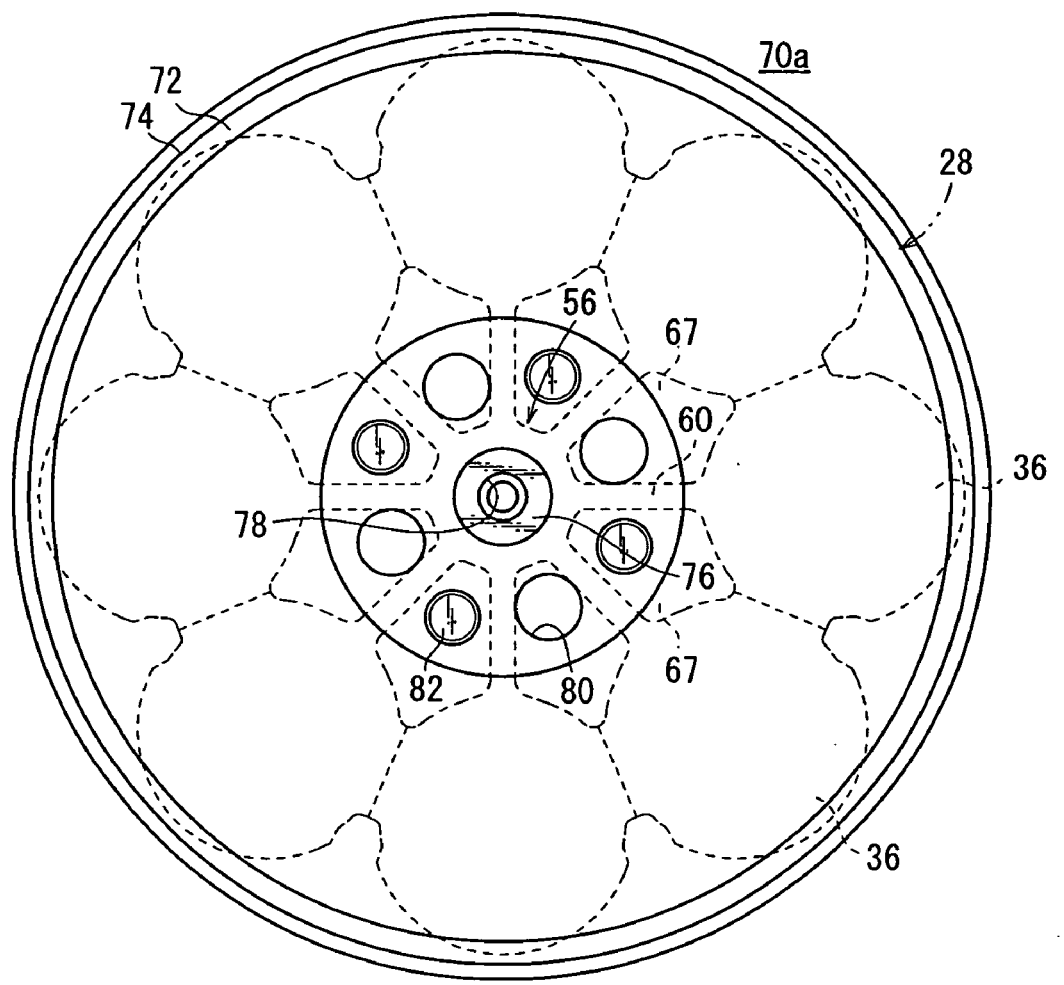
FIG. 7 is a front view showing an end plate of the fuel cell stack.

In the end plate 70a, holes 80 and screw holes 82 are formed alternately along a virtual circle around the protrusion 76. The holes 80 and the screw holes 82 are spaced from each other by predetermined intervals (angles). As shown in FIG. 7, the holes 80 and the screw holes 82 are provided at positions corresponding to respective spaces of the oxygen-containing gas supply unit 67 formed between the first and second bridges 34, 60. As shown in FIG. 1, the diameter of the end plate 70b is larger than the diameter of the end plate 70a. The end plate 70b is a thin electrically conductive plate.

The casing 18 includes a first case unit 86a containing the load applying mechanism 21 and a second case unit 86b containing the fuel cell stack 12. The end plate 70b and an insulating member are sandwiched between the first case unit 86a and the second case unit 86b. The insulating member is provided on the side of the second case unit 86b. The joint portion between the first case unit 86a and the second case unit 86b is tightened by screws 88 and nuts 90. The end plate 70b functions as a heat barrier for preventing entry of the hot exhaust gas or the hot air from the fluid unit 19 into the load applying mechanism 21.

An end of a ring shaped outer wall plate 92 of the heat exchanger 14 is joined to the second case unit 86b, and a head plate 94 is fixed to the other end of the outer wall plate 92. The fluid unit 19 is provided symmetrically with respect to the central axis of the fuel cell stack 12. Specially, the substantially cylindrical reformer 16 is provided coaxially inside the substantially ring shaped heat exchanger 14.

A wall plate 96 is fixed to the groove 74 around the end plate 70a to form a chamber unit 98. The heat exchanger 14 and the reformer 16 are directly connected to the chamber unit 98. The air heated at the heat exchanger 14 temporarily fills a chamber 98a in the chamber unit 98. Holes 80 are formed as openings for supplying the air temporarily filled in the chamber 98a to the fuel cell stack 12.

A fuel gas supply pipe 100 and a reformed gas supply pipe 102 are connected to the reformer 16. The fuel gas supply pipe 100 extends to the outside from the head plate 94. The reformed gas supply pipe 102 is inserted into the hole 78 of the end plate 70a, and connected to the fuel gas supply passage 30.

An air supply pipe 104 and an exhaust gas pipe 106 are connected to the head plate 94. First passages 108 extending from the air supply pipe 104 to the chamber unit 98 through the heat exchanger 14 and second passages 110 extending from the exhaust gas channel 68 of the fuel cell stack 12 to the exhaust gas pipe 106 through the heat exchanger 14 are provided in the casing 18. The air before consumption flows through the first passages 108 in a direction indicated by an arrow A1. The exhaust gas flows in the second passages 110 in a direction indicated by an arrow A2. That is, the air and the exhaust gas flow in a counterflow manner.

The load applying mechanism 21 includes a first tightening unit 112a for applying a first tightening load T1 to a region around (near) the fuel gas supply passage 30 and a second tightening unit 112b for applying a second tightening load T2 to the electrolyte electrode assemblies 26. The second tightening load T2 is smaller than the first tightening load T1 (T1>T2).

Figure 8:
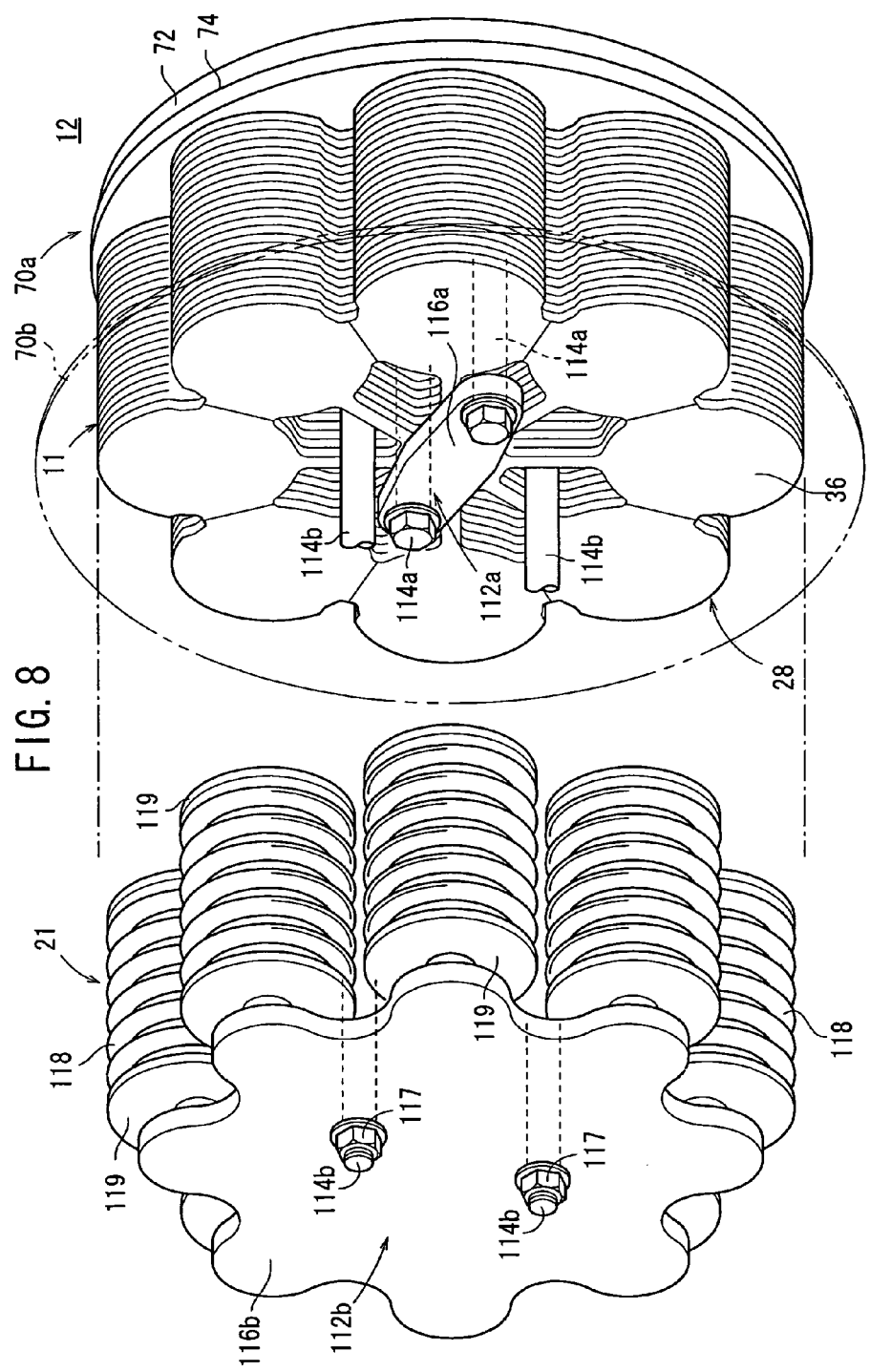
FIG. 8 is a partial exploded perspective view showing a load applying mechanism of the fuel cell system.

As shown in FIGS. 1, 2, and 8, the first tightening unit 112a includes short first tightening bolts 114a screwed into the screw holes 82 provided along one diagonal line of the end plate 70a. The first tightening bolts 114a extend in the stacking direction of the fuel cells 11, and engage a first presser plate 116a. The first tightening bolts 114a are provided in the oxygen-containing gas supply unit 67 in the separators 28. The first presser plate 116a is a narrow plate, and engages the central position of the separator 28 to cover the fuel gas supply passage 30.

The second tightening unit 112b includes long second tightening bolts 114b screwed into the screw holes 82 provided along the other diagonal line of the end plate 70a. Ends of the second tightening bolts 114b extend through a second presser plate 116b having a curved outer section. Nuts 117 are fitted to the ends of the second tightening bolts 114b. The second tightening bolts 114b are provided in the oxygen-containing gas supply unit 67 in the separators 28. Springs 118 and spring seats 119 are provided in respective circular portions of the second presser plate 116b, at positions corresponding to the electrolyte electrode assemblies 26 on the circular disks 36 of the fuel cell 11. For example, the springs 118 are ceramics springs.

Figure 9:
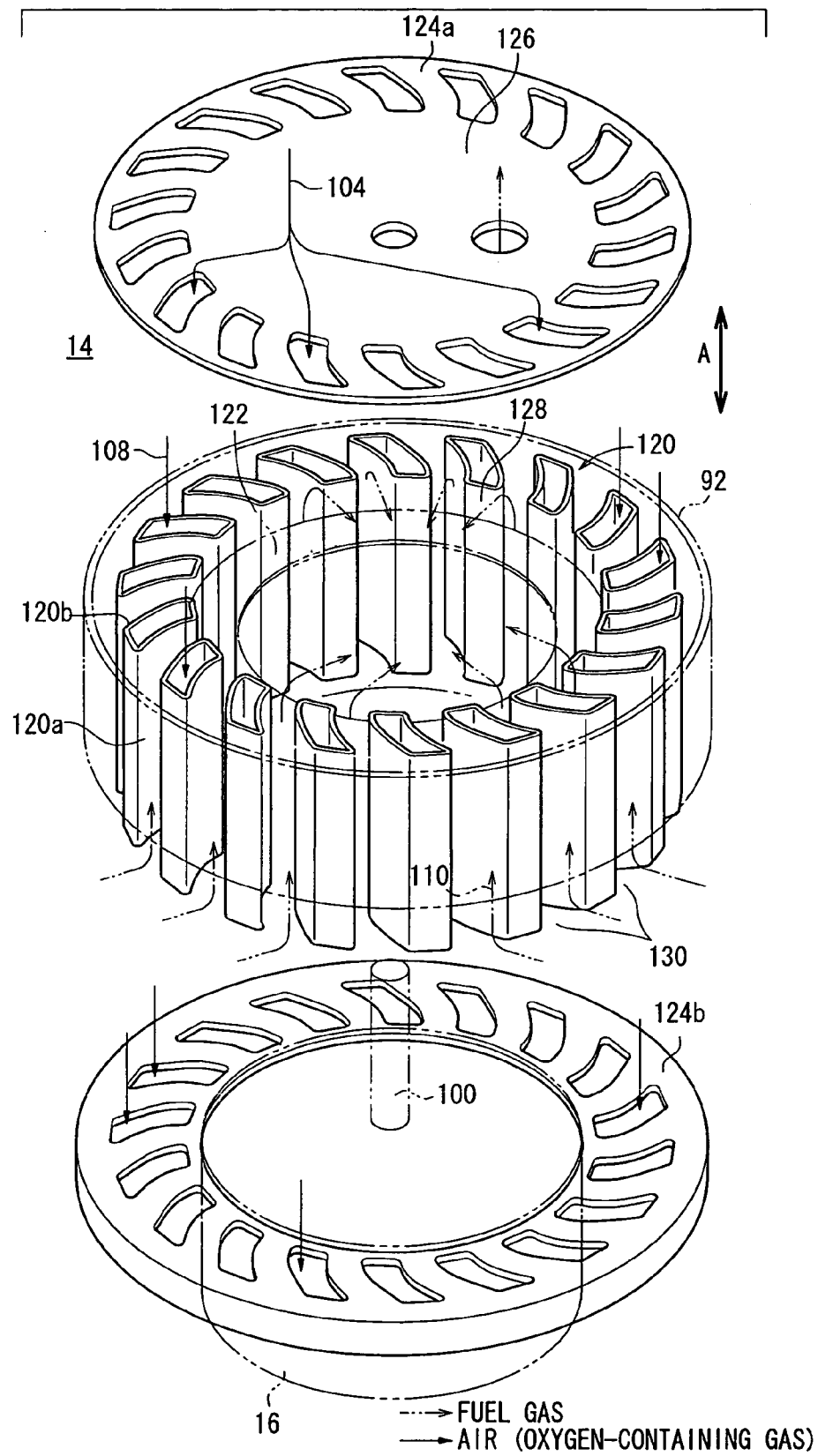
FIG. 9 is a perspective view showing main components of the heat exchanger.
Figure 10:
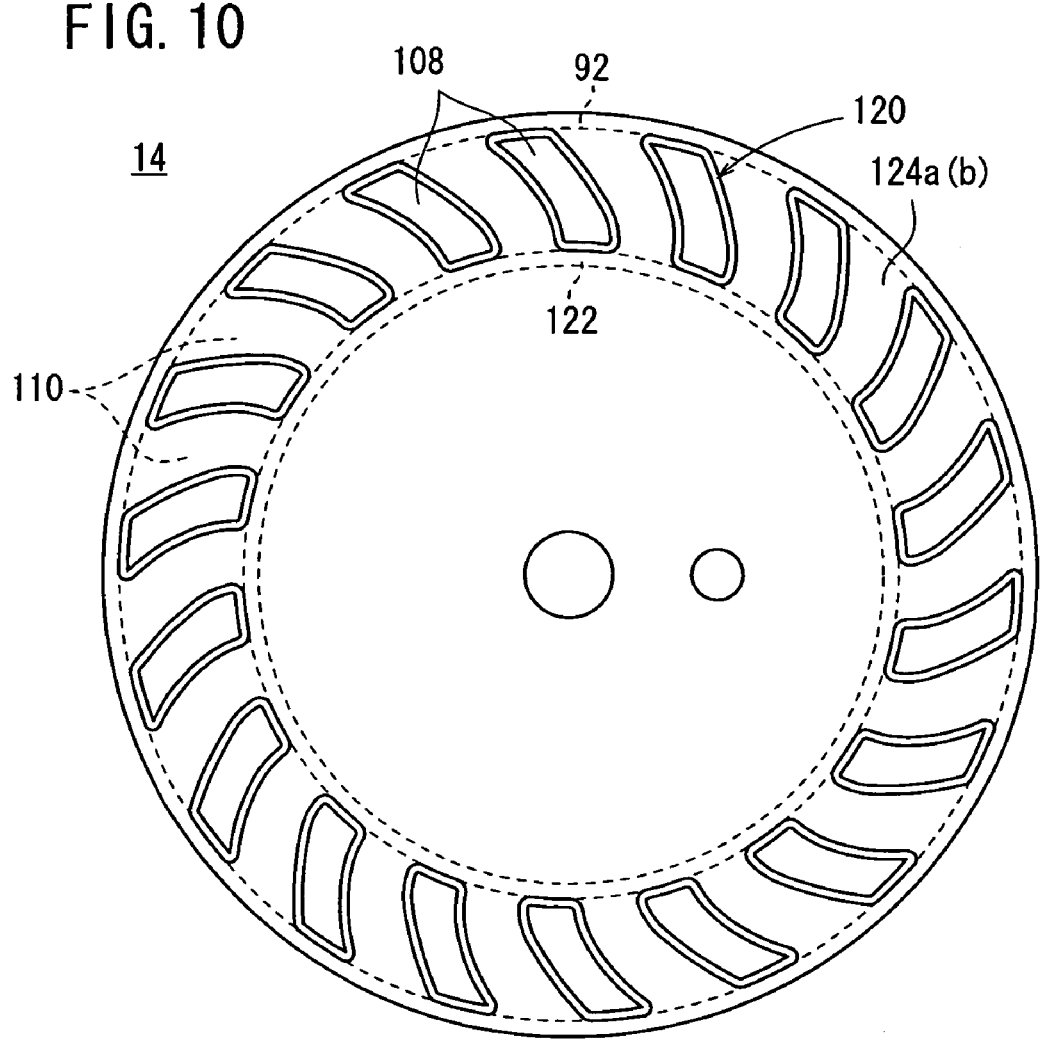
FIG. 10 is a front view showing main components of the heat exchanger.

In the heat exchanger 14 according to the first embodiment, as shown in FIGS. 9 and 10, a plurality of heat conductive pipes 120 are provided between the outer wall plate 92 and an inner wall plate 122. That is, the heat conductive pipes 120 are provided in a body unit of the heat exchanger 14. The heat conductive pipes 120 are spaced at predetermined angular intervals. The first passages 108 are formed in the heat conductive pipes 120, and the second passages 110 are formed between the heat conductive pipes 120. Opposite walls 120a, 120b of the heat conductive pipes 120 limiting the passage width of the first passage 108 are formed along the involute curves. The ends of the outer wall plate 92 are not aligned with the ends of the inner wall plate 122 to form an exhaust gas inlet (second fluid inlet) 130 and an exhaust gas outlet (second fluid outlet) 128 for the second passages 110. Since the first passages 108 are formed along the involute curves, the second passages 110 have the passage width in correspondence with the involute curves.

Opposite ends of the heat conductive pipes 120 are inserted into the flanges 124a, 124b. The outer circumferential surfaces and the inner circumferential surfaces of the heat conductive pipes 120 are joined to the outer wall plate 92 and the inner wall plate 122. The adjacent heat conductive pipes 120 are provided along the involute curves. Thus, the second passages 110 are formed between the heat conductive pipes 120.

Figure 11:
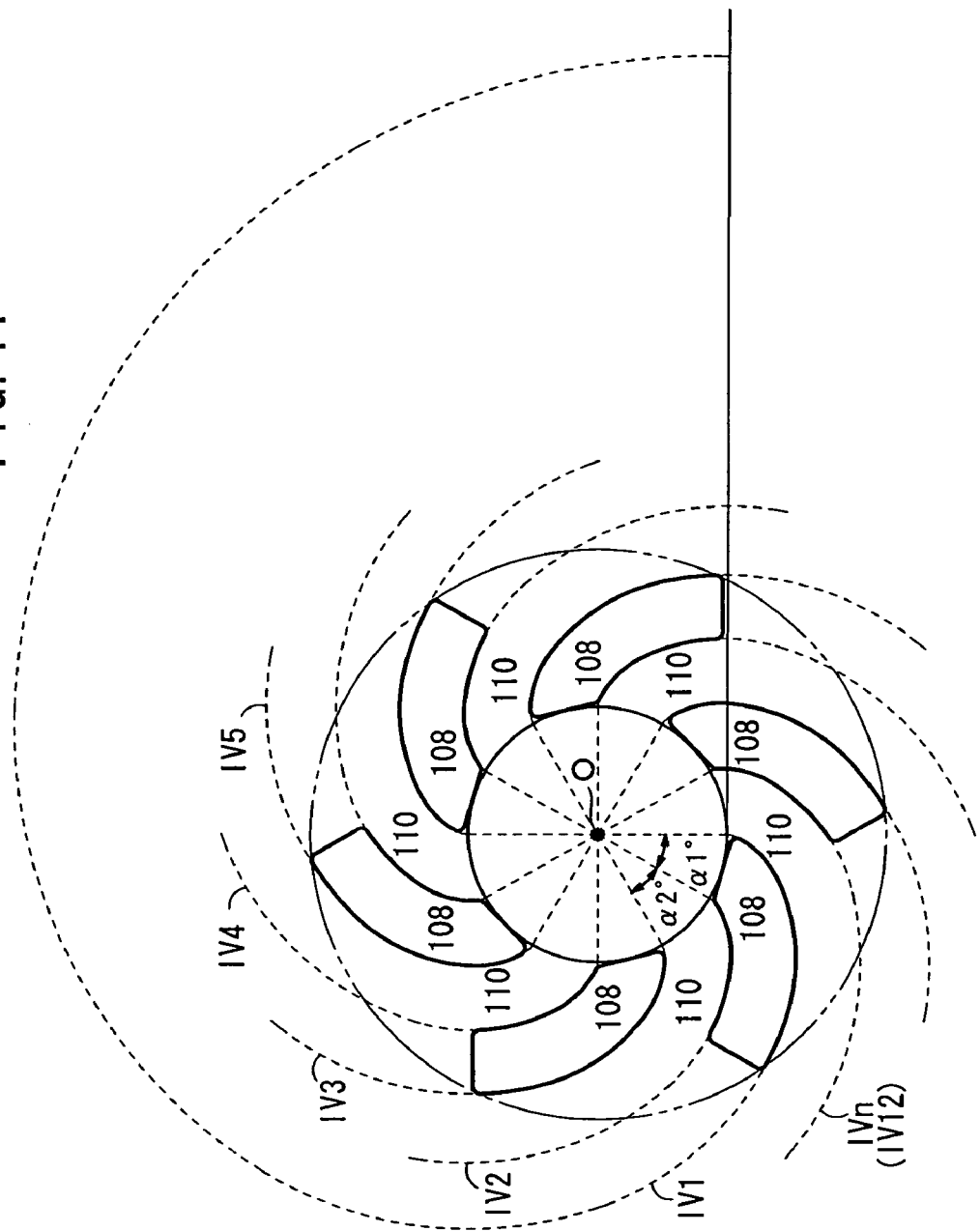
FIG. 11 is a view showing heat conductive pipes of the heat exchanger.

Specifically, as shown in FIG. 11, an involute curve IV1 is formed around the center O. An involute curve IV2 is formed at a position spaced at an angle of α1° from the involute curve IV1. Likewise, an involute curve IV3 is formed at a position spaced at an angle of α2° from the involute curve IV2. Thereafter, the other involute curves are formed in the same manner until a predetermined involute curve IVn is formed.

It should be noted that the angle α1° is equal to the angle α2° (α1°=α2°) so that the surface area of the wall of the first passage 108 becomes equal to the surface area of the wall of the second passage 110. For example, assuming that the number of the first passages 108 is six and the number of the second passages 110 is six, the angle α1° and the angle α2° are 30° (α1°=α2°=30°). In this case, the six heat conductive pipes are provided such that the first and second passages 108, 110 are formed alternately along the involute curves IV1 to IV12. In the first embodiment, as shown in FIGS. 9 and 10, the number of the heat conductive pipes 120 is 18.

As shown in FIG. 1, the inlet sides of the heat conductive pipes 120 are connected to a chamber (first fluid inlet) 126 formed inside the head plate 94. The exhaust gas outlet 128 is formed by cutting out the inner wall plate 122 at a position near the chamber 126. The outlet sides of the second passages 110 are connected to the exhaust gas outlet 128. The chamber 98a as the first fluid outlet is provided oppositely to the chamber 126. The outlet sides of the first passages 108 are connected to the chamber 98a. The exhaust gas inlet 130 is provided near the chamber 98a. The inlet sides of the second passages 110 are connected to the exhaust gas inlet 130.

Figure 12:
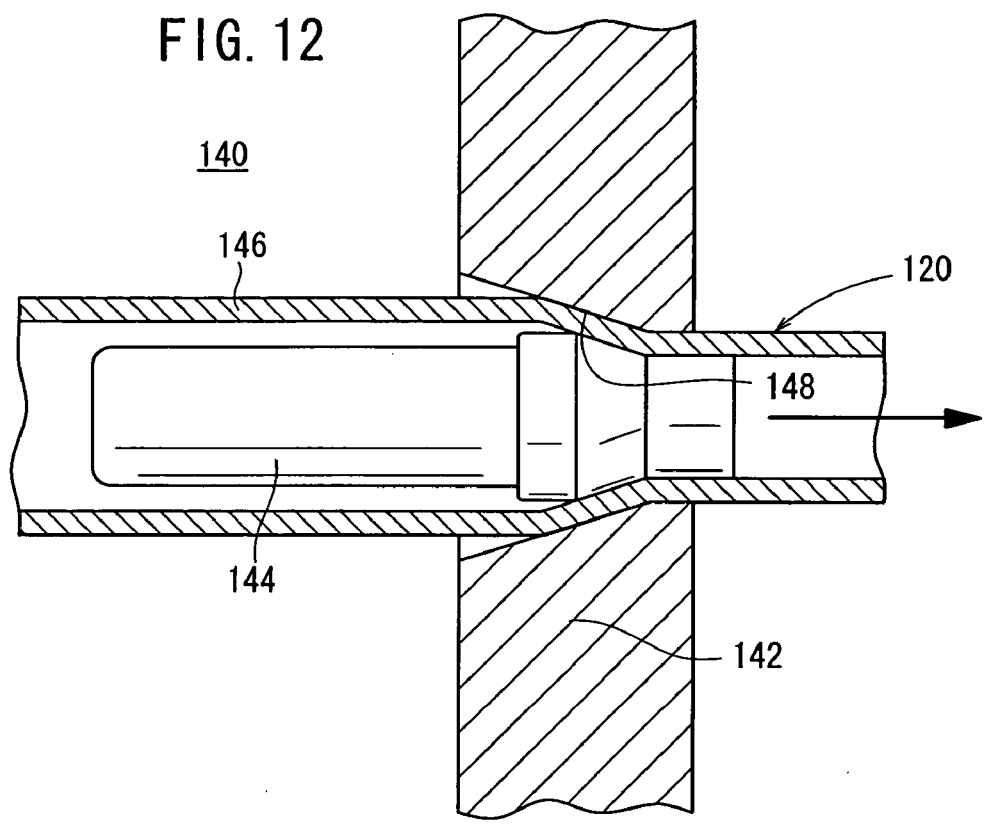
FIG. 12 is a view showing a drawing machine for forming the heat conductive pipe.

For example, the heat conductive pipe 120 is made of heat resistive stainless material, and formed into one piece having a seamless, continuous shape by a drawing process or an extrusion process. FIG. 12 shows a drawing machine 140. The drawing machine 140 includes a die 142 and a plug 144. Annular material 146 is drawn through a gap 148 between the die 142 and the plug 144 to form a single piece of the heat conductive pipe 120.

The heat conductive pipe 120 may not be formed by the cold drawing process as described above. Though not shown, heated material may be filled in an extrusion machine to form a single piece of the heat conductive pipe 120 by the extrusion process.

Operation of the fuel cell system 10 will be described below.

As shown in FIG. 3, in assembling the fuel cell system 10, firstly, the separator 28 is joined to the channel member 56 on its surface facing the cathode 22. Therefore, the fuel gas supply channel 66 connected to the fuel gas supply passage 30 is formed between the separator 28 and the channel member 56. The fuel gas supply channel 66 is connected to the fuel gas channel 46 through the fuel gas inlet 54 (see FIG. 6). The ring shaped insulating seal 69 is provided on each of the separators 28 around the fuel gas supply passage 30.

In this manner, the separator 28 is fabricated. Eight electrolyte electrode assemblies 26 are interposed between the separators 28 to form the fuel cell 11. As shown in FIGS. 3 and 4, the electrolyte electrode assemblies 26 are interposed between the surface 36a of one separator 28 and the surface 36b of the other separator 28. The fuel gas inlet 54 of the circular disk 36 is positioned at the center in each of the anodes 24.

A plurality of the fuel cells 11 are stacked in the direction indicated by the arrow A, and the end plates 70a, 70b are provided at opposite ends in the stacking direction. As shown in FIGS. 1, 2 and 8, the first presser plate 116a of the first tightening unit 112a is provided at the center of the fuel cell 11.

In this state, the short first tightening bolts 114a are inserted through the first presser plate 116a and the end plate 70b toward the end plate 70a. Tip ends of the first tightening bolts 114a are screwed into, and fitted to the screw holes 82 formed along one of the diagonal lines of the end plate 70a. The heads of the first tightening bolts 114a engage the first presser plate 116a. The first tightening bolts 114a are screwed into the screw holes 82 to adjust the surface pressure of the first presser plate 116a. In this manner, in the fuel cell stack 12, the first tightening load T1 is applied to the region near the fuel gas supply passage 30.

Then, the springs 118 and the spring seats 119 are aligned axially with the electrolyte electrode assemblies 26 at respective positions of the circular disks 36. The second presser plate 116b of the second tightening unit 112b engage the spring seats 119 provided at one end of the springs 118.

Then, the long second tightening bolts 114b are inserted through the second presser plate 116b and the end plate 70b toward the end plate 70a. The tip end of the second tightening bolts 114b are screwed into, and fitted to the screw holes 82 formed along the other diagonal line of the end plate 70a. The nuts 117 are fitted to the heads of the second tightening bolts 114b. Therefore, by adjusting the state of the screw engagement between the nuts 117 and the second tightening bolts 114b, the second tightening load T2 is applied to the electrolyte electrode assemblies 26 by the elastic force of the respective springs 118.

The end plate 70b of the fuel cell stack 12 is sandwiched between the first case unit 86a and the second case unit 86b of the casing 18. The insulating member is interposed between the second case unit 86b and the end plate 70b, and the first case unit 86a and the second case unit 86b are fixed together by the screws 88 and the nuts 90. The fluid unit 19 is mounted in the second case unit 86b. The wall plate 96 of the fluid unit 19 is attached to the groove 74 around the end plate 70a. Thus, the chamber unit 98 is formed between the end plate 70a and the wall plate 96.

Next, in the fuel cell system 10, as shown in FIG. 1, a fuel (methane, ethane, propane, or the like) and, as necessary, water are supplied from the fuel gas supply pipe 100, and an oxygen-containing gas (hereinafter referred to as "air") is supplied from the air supply pipe 104.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slit 62 in the separator 28 of each fuel cell 11 (see FIG. 6).

The fuel gas flows along the fuel gas supply channel 66 between the first and second bridges 34, 60, and flows into the fuel gas channel 46 from the fuel gas inlets 54 of the circular disks 36. The fuel gas inlets 54 are formed at positions corresponding to central regions of the anodes 24 of the electrolyte electrode assemblies 26. Thus, the fuel gas is supplied from the fuel gas inlets 54 to the substantially central positions of the anodes 24, and flows outwardly from the central regions of the anodes 24 along the fuel gas channel 46.

As shown in FIG. 1, air from the air supply pipe 104 flows through the first passages 108 of the heat exchanger 14, and temporarily flows into the chamber 98a. The air flows through the holes 80 connected to the chamber 98a, and is supplied to the oxygen-containing gas supply unit 67 provided at substantially the center of the fuel cells 11. At this time, in the heat exchanger 14, as described later, since the exhaust gas discharged to the exhaust gas channel 68 flows through the second passages 110, heat exchange between the air before supplied to the fuel cells 11 and the exhaust gas is performed. Therefore, the air is heated to a desired fuel cell operating temperature beforehand.

The oxygen-containing gas supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 6, in the oxygen-containing gas channel 50, the air flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22. At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the second passages 110 of the heat exchanger 14, heat exchange between the exhaust gas and the air is carried out. Then, the exhaust gas is discharged into the exhaust gas pipe 106.

In the first embodiment, as shown in FIGS. 9 to 11, the heat conductive pipes 120 forming the first passages 108 for the air before reaction has the opposite walls 120*a*, 120*b* limiting the passage width of the first passages 108, and the walls 120*a*, 120*b* are formed along the involute curves.

Therefore, the passage width of the first passages 108 is constant from the inner wall plate 122 to the outer wall plate 92, and non-uniform flow of the air does not occur in the first passages 108. Accordingly, the air flows smoothly along the first passages 108. The heat is efficiently transmitted from the exhaust gas flowing through the second passages 110 to the air, and improvement in the heat exchange efficiency is achieved effectively.

Further, the adjacent heat conductive pipes 120 are provided along the involute curves to form the second passages 110. Therefore, the passage width of the second passages 110 is constant from the inner wall plate 122 to the outer wall plate 92. Accordingly, the heat is efficiently transmitted from the second passages 110 to the heat conductive pipes 120, and improvement in the heat exchange efficiency is achieved.

Further, since the first and second passages 108, 110 are formed along the involute curves, respectively, the passage widths of the first and second passages 108, 110 are constant, and the heat conductive surface areas of the first and second passages 108, 110 are the same. The heat exchange is equivalently carried out between the first and second passages 108, 110. Thus, improvement in the heat conductivity and heat exchange efficiency is achieved. Further, it is possible to obtain the heat exchanger 14 having high heat exchange performance, and the size of the heat exchanger 14 is reduced.

Further, by forming the heat conductive pipes 120 along the involute curves, the number of the pipes is reduced in comparison with the case of using circular pipes, while achieving the same the heat conductive surface area as in the case of the circular pipes. Thus, the structure becomes compact, and the pressure loss is reduced. It is possible to produce the small heat exchanger 14 having the high heat exchange efficiency.

Further, each of the heat conductive pipes 120 is formed into one piece having the seamless and continuous shape, by the drawing process or the extrusion process. Thus, the oxygen-containing gas and the exhaust gas flow smoothly inside, and around the heat conductive pipes 120. Non-uniform gas flow does not occur, and improvement in the anti-corrosive characteristic of the heat conductive pipes 120 is achieved. Consequently, the durability of the heat exchanger 14 is improved effectively. Further, since the heat conductive pipe 120 has the seamless structure, it is not necessary to weld seam joints for fabricating the heat conductive pipe 120. That is, the time and cost required for fabricating the heat conductive pipe 120 are reduced advantageously.

Further, the air flows through the first passages 108 and the exhaust gas flows through the second passages 110 in a counterflow manner. Therefore, the efficiency in the heat exchange between the exhaust gas and the air is improved effectively. At this time, since the heat energy (calorie) of the exhaust gas is utilized, the thermal efficiency in the fuel cell system 10 is improved desirably as a whole.

Figure 13:
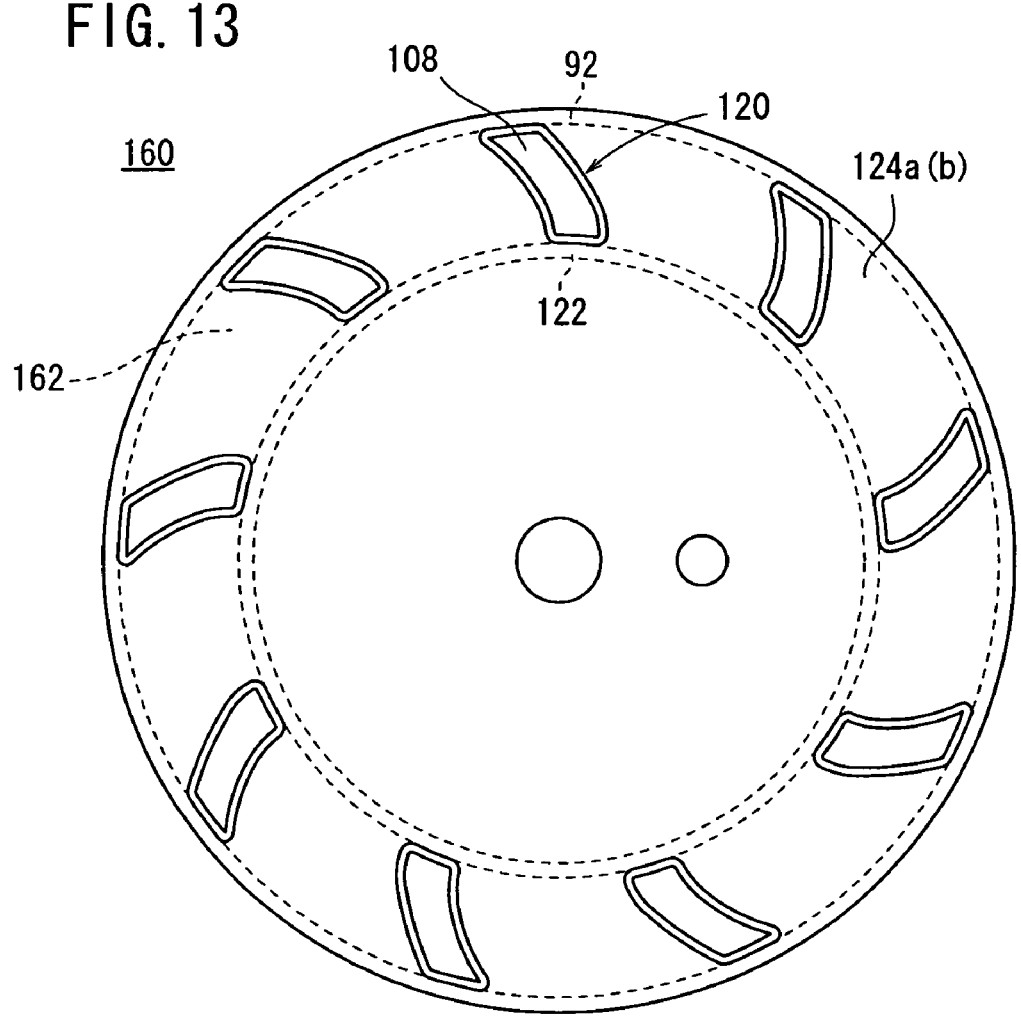
FIG. 13 is a front view showing main components of a multi-pipe heat exchanger according to a second embodiment of the present invention.
Figure 14:
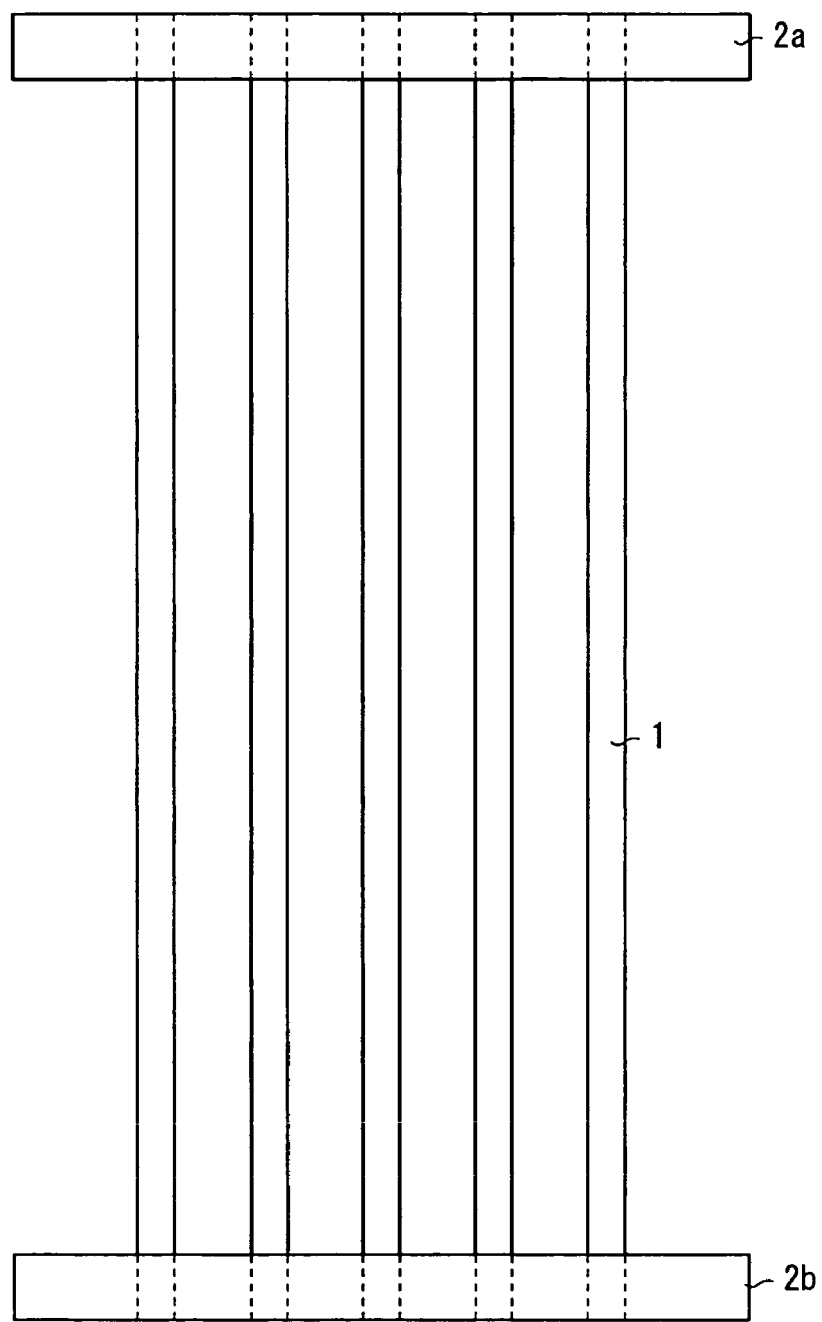
FIG. 14 is a view showing a conventional multi-pipe heat exchanger.

FIG. 13 is a view showing main components of a heat exchanger (multi-pipe heat exchanger apparatus) 160 according to a second embodiment of the present invention. The constituent elements that are identical to those of the heat exchanger 14 according to the first embodiment are labeled with the same reference numeral, and description thereof will be omitted.

In the heat exchanger 160, the heat conductive pipes 120 are spaced away from each other at relatively large angles. Second passages 162 each having a relatively large passage width is formed between the heat conductive pipes 120. The second passages 162 are formed by providing the heat conductive pipes 120 along the involute curves. The passage width of the first passage 108 and the passage width of the second passage 162 are adjusted by the volume of the air flowing through the first passage 108 and the volume of the exhaust gas flowing through the second passage 162.

Thus, in the second embodiment, the heat conductive pipes 120 are arranged in consideration of the difference between the volume of the air flowing into the first passages 108 and the volume of the exhaust gas flowing into the second passages 162 of the heat exchanger 160. For example, assuming that the volume of the air is twice as much as the volume of the exhaust gas, the number of the heat conductive pipes 120 is increased such that the heat conductive surface area of the first passage 108 becomes twice as large as the heat conductive surface area of the second passage 110. In this manner, it is possible to achieve the optimum efficiency in the heat exchange between the air and the exhaust gas. Thus, improvement in the thermal efficiency of the fuel cell is achieved effectively.

The invention has been particularly shown and described with reference to a preferred embodiment, it will be understood that variations and modifications can be effected thereto by those skilled in the art without departing from the spirit and scope of the invention as defined by the appended claims.

What is claimed is:

1. A multi-pipe heat exchanger apparatus comprising a body unit and a plurality of heat conductive pipes provided in said body unit, first passages for a first fluid being formed in said heat conductive pipes, second passages for a second fluid being formed between said heat conductive pipes, said body unit comprising flanges provided at opposite ends thereof, an outer wall plate and an inner wall plate, said heat conductive pipes being provided at said flanges at predetermined angular intervals, wherein each of said heat conductive pipes has opposite walls limiting the passage width of said first passage, and said walls are formed along involute curves;

each of said second passages is formed by said walls of adjacent heat conductive pipes formed along said involute curves;

an outer circumferential surface of each of said heat conductive pipes is joined to said outer wall plate of said body unit, and an inner circumferential surface of each of said heat conductive pipes is joined to said inner wall plate of said body unit.

2. A multi-pipe heat exchanger apparatus according to claim 1, wherein said heat conductive pipe has a seamless continuous shape.

3. A multi-pipe heat exchanger apparatus according to claim 1, wherein a first fluid inlet and a second fluid outlet are provided at one end of said body unit such that said first fluid flows into said first passages through said first fluid inlet and said second fluid is discharged from said second passages through said second fluid outlet; and a first fluid outlet and a second fluid inlet are provided at the other end of said body unit such that said first fluid is discharged from said first passages through said first fluid outlet and said second fluid flows into said second passages through said second fluid inlet.

4. A multi-pipe heat exchanger apparatus according to claim 3, wherein said first fluid flows through the said first passages and said second fluid flows through said second passages in a counterflow manner.

5. A multi-pipe heat exchanger apparatus according to claim 1, wherein said second fluid is an exhaust gas.

6. A multi-pipe heat exchanger apparatus according to claim 3, wherein ends of said outer wall plate are out of alignment with ends of said inner wall plate to form said second fluid inlet and said second fluid outlet for said second passages.

7. A method of producing a multi-pipe heat exchanger apparatus having a body unit, a plurality of heat conductive pipes provided in said body unit, first passages being formed in said heat conductive pipes, second passages being formed between said heat conductive pipes, said body unit comprising flanges provided at opposite ends thereof, an outer wall plate and an inner wall plate, said heat conductive pipes being provided at said flanges at predetermined angular intervals, the method comprising the steps of:

forming opposite walls of each of said heat conductive pipes along involute curves, said walls limiting the passage width of said first passage, said second passages being formed by said walls of adjacent heat conductive pipes along said involute curves, joining an outer circumferential surface of each of said heat conductive pipes to said outer wall plate of said body unit, and joining an inner circumferential surface of each of said heat conductive pipes to said inner wall plate of said body unit.

8. A production method according to claim 7, wherein said heat conductive pipe is formed into one piece having a seamless continuous shape by a drawing process or an extrusion process.

9. A production method according to claim 7, wherein adjacent heat conductive pipes are provided along the involute curves to form said second passages.

\* \* \* \* \*